June 10, 1952  H. L. E. DUMAS  2,599,901
CURRENT METER
Filed Jan. 13, 1948  2 SHEETS—SHEET 2

INVENTOR.
Henry L. E. Dumas
BY
George N. Corey
ATTORNEY

UNITED STATES PATENT OFFICE 2,599,901

CURRENT METER

Henry Louis Etienne Dumas, Grenoble, France

Application January 13, 1948, Serial No. 1,933
In France December 28, 1946

Section 1, Public Law 690, August 8, 1946
Patent expires December 28, 1966

16 Claims. (Cl. 73—187)

The present invention is concerned with an apparatus which may be used optionally for measuring the velocity of flow of a liquid or the velocity at which an object moves through a liquid when the latter is in a quiescent state. More particularly, the invention relates to an improved current meter of the type sometimes spoken of as a "hydraulic mill" wherein a helicoidal vane or screw is driven by the moving liquid, or by reason of the movement of the meter through a body of the liquid, and as the screw revolves it operates, either directly or through a suitable reduction gearing, to make and break a contact in an electrical circuit thereby setting up impulses in that circuit which actuate a counter or other registering or indicating mechanism.

In the use of such meters a great simplicity of operation is required, and for their maintenance and repair it is desirable that the principal parts be capable of being taken apart and repaired with the minimum of use of either ordinary or special tools. Such apparatus requires a perfect sealing with the aim of preventing circulation of the outside liquid to the interior working parts of the apparatus and to oppose likewise the introduction of solid materials into the mechanism. Otherwise, absolute certainty of the making and breaking of the electrical contact and reduction of the passive resistance to a minimum will not be insured.

It is often also required that such meters be universal; that is to say, that they offer possibilities of use on various kinds of supports, both fixed and mobile, or be attached to cables or floats, with or without counterweights or fins for balance or equilibrium and, also, that they be capable of use as electrical logs for measuring speeds of transition of boats or other objects through a liquid.

In certain prior meters of this type the dismantling made necessary to permit of adjustment of maintenance of the principal parts requires the use of tools such as ordinary or special screw drivers, tightening keys or other more special tools which may become lost or misplaced. Moreover, the contact chamber and the space for the reduction gearing usually are formed directly within and as a part of the body of the meter, with the result, in case of accident to these units, that the whole apparatus has to be withdrawn from use and returned to the manufacturer for repairs or perhaps discarded entirely.

Further, such meters are usually so designed as to permit of adjustment to provide either one or two make and break contacts per revolution of the reduction gearing. In certain of the prior apparatus, this has required the use of one or even two exterior conductors which may give rise to short circuits or leakage of current. In others it has been necessary to take one or several pieces of the meter apart and in others to transfer a conductor from one terminal to another. Both of the types last mentioned have the drawback that it is inconvenient to make adjustments of them if they are not situated in a readily accessible place. It is also sometimes useful to obtain directly a contact or several contacts by a single turn of the shaft.

In certain of the prior current meters of this type the sealing of the parts from the surrounding liquid is realized by a system of quasi-capillary sheating surrounding the shaft. These sheaths are often of a diameter such that a strong resisting couple is set up due to the layer of lubricant which is confined within a space where the Reynolds number is very weak. This lessens considerably the sensitivity of the apparatus to slow flow velocities.

The contact chamber and the reduction gearing chamber which are customarily situated to the rear of the passageway for the drive shaft are usually reached from the outside of the meter body through a common or separate openings closed by screw-down lids or by covers which fit in slideways formed in the outside casing of the device. In either case, through wear or other deterioration the sealing joints may eventually allow an internal circulation of the lubricant from front to rear with resultant introduction of foreign materials into the mechanism situated in these chambers.

The electric contact, or contacts, if two are provided, are usually connected with corresponding exterior terminals which, by reasons of their surface and their proximity to the main body of the enclosing housing of the device determine a line of choice for the current to escape with the disadvantage when the device is being used in liquid conductors such as salt water, of augmenting the consumption of the dry cells supplying the indicating or registering apparatus and sometimes even paralyzing its functioning. When the contact chamber is formed as a chamber separate from the reduction gearing chamber it is customary practice to fill it with a heavy oil which slows down the current leakage. But since the closing of this chamber is most often realized by a screw-down lid with consequent interposition of a joint that can deteriorate, there is a tendency in time for the oil to escape and to be replaced by the outside liquid which, if it is a conductor, will place the contacts in short circuit.

As a more or less general practice the helical screw is attached to the shaft of the apparatus by tightening the hub of the helical screw against a shoulder formed on the shaft near its end. The shaft is threaded at its end which passes through the hub of the screw and the latter is tightened against the shoulder by a nut having a sidewise contour approximating the shape of the hub of the helical screw and prolonging its length. This nut is usually secured on the threaded end of the shaft with the aid of a special tightening tool.

In certain other forms of such devices, in particular the current meters having capillary sealing sheathing, the helical screw has a hollowed out hub in which is lodged a roller bearing cage which is held in the hub by the aid of a threaded socket. It frequently happens that as a consequence of vibrations sustained by the device, especially in strong, fast currents, the screw nut holding the helical screw onto the shaft and the threaded socket will progressively unscrew themselves loosening the helical screw which may perhaps become lost. In order to avoid such an accident it is often the practice to tighten the nut holding the helical screw and also the bearing cage in its socket to the point where a permanent set has taken place. By following this practice there is a risk of ruining the helical screw, and, moreover, the aspect of the metallic surfaces of the helical screw is altered.

In most of the prior helical screw type of current meters the reduction from the speed of rotation of the screw is realized by use of a worm secured to the shaft and driving a toothed wheel. The making and breaking of the electrical contacts is readily brought about in various ways; for example, by an arrangement which includes one or several fixed lugs on the lateral faces of the toothed wheel or one or more cams on the hub of that wheel cooperating with a spring restored lever. The lever is replaced sometimes by a simple resilient plate. The lever or the blade is raised up by the lugs or the cams at each revolution or part of a revolution of the toothed wheel, and thus makes and breaks the contact. A braking action on the toothed wheel and the shaft which drives it is generally also produced due to the continuous rubbing of the lever or of the blade on the hub of that wheel. The resulting friction, which depends on the stiffness of the spring used to restore the lever or on the stiffness of the blade, is additional to the friction of the worm on the teeth of the toothed wheel, and becomes more pronounced when the lever or the blade is lifted by the pins or the cams. This brings about a reduction of the sensitivity of the apparatus to low liquid flow velocities and in certain current meters adds to the reduction of the sensitivity produced by the layer of oil in the capillary sealing sheath.

In the special devices known as electrical logs that are used for measuring velocities near free surfaces, the thrust of the current on the screw is translated into a force applied in traction to the shaft contrary to that which happens in ordinary helical screw meters. However, most of the helical screw meters, of which certain ones are called universals, possess only bearings designed to receive a thrust on the shaft and are not designed to accommodate for the application of tractive forces to it. This excludes their use as electrical logs and, therefore, limits their field of use.

The present invention has for its general objective the remedying or minimizing of the various inconveniences of the prior devices which have been hereinbefore specified.

One of the principal objects of the invention is to provide a device of the kind described in which the principal parts consist of cylindrical elements or are disposed within cylindrical units which are assembled in coaxial interfitting relationships by simple fitting engagements and fixing actions and without recourse to screw threading of the engaging parts or use of fixing screws or similar deformable tightening or locking means.

It is a further object of the invention to provide a device of the kind described which may be assembled and disassembled by hand without requiring the use of either ordinary or special tools.

It is still another object of the invention to provide a device of the kind described wherein the contact mechanism, the reduction gearing, the associated mechanical interrupter mechanism, and the bearing supports for the primary shaft are assembled in separately removable units and readily interchangeable with like units or with similar units adapted to perform different functions.

It is a further object of the invention to provide in a device of the kind described an association of the elements which makes it possible to regulate the number of make and break contacts established by the internal mechanical interrupter from the outside by merely rotating one part of the assembly with reference to certain other parts therewith.

It is another object of the invention to provide a device of the kind described wherein is brought about in a more positive and simple manner the sealing of the electrical contacts and their lead connections against access of conductive liquids thereto and also against undesired circulation of the lubricant disposed in the reduction gearing portion of the assembly lengthwise of the apparatus into the portion set apart for the electrical contacts and their lead connections.

It is another object of the invention to provide as a separately removable unit a contact chamber which is sealed against entrance of extraneous liquids without the intervention of screw threaded joints or similar means subject to become deformed or to other failure.

It is still a further feature of the invention to provide a removable decantation chamber for intercepting foreign matter that works its way past the clearance space between the movable part of the outer casing associated with the helical screw and the stationary portion of the outer casing before such matter has an opportunity to interfere with the free movement of the operating parts.

It is still another object of the invention to provide an improved disposition for fixing the helical screw to the main shaft without risk of deforming the surfaces of the blades.

It is a still further feature of the invention to so arrange the lead-in connection and the electrically conductive elements associated therewith as to reduce and substantially nullify any tendency for the electrical current to leak from the apparatus or to become short circuited.

It is yet another feature of the invention that the device is capable of use either as a current meter or as an electrical log.

Reference is made to the appended drawings and the ensuing description for a better understanding of the invention, it being understood, however, that the embodiment set forth in the drawings is given only by way of example and not as limitative of the scope of the invention.

In the drawings.

In the several figures the same elements are designated by the same reference numbers.

Figures 1, 2, 8:
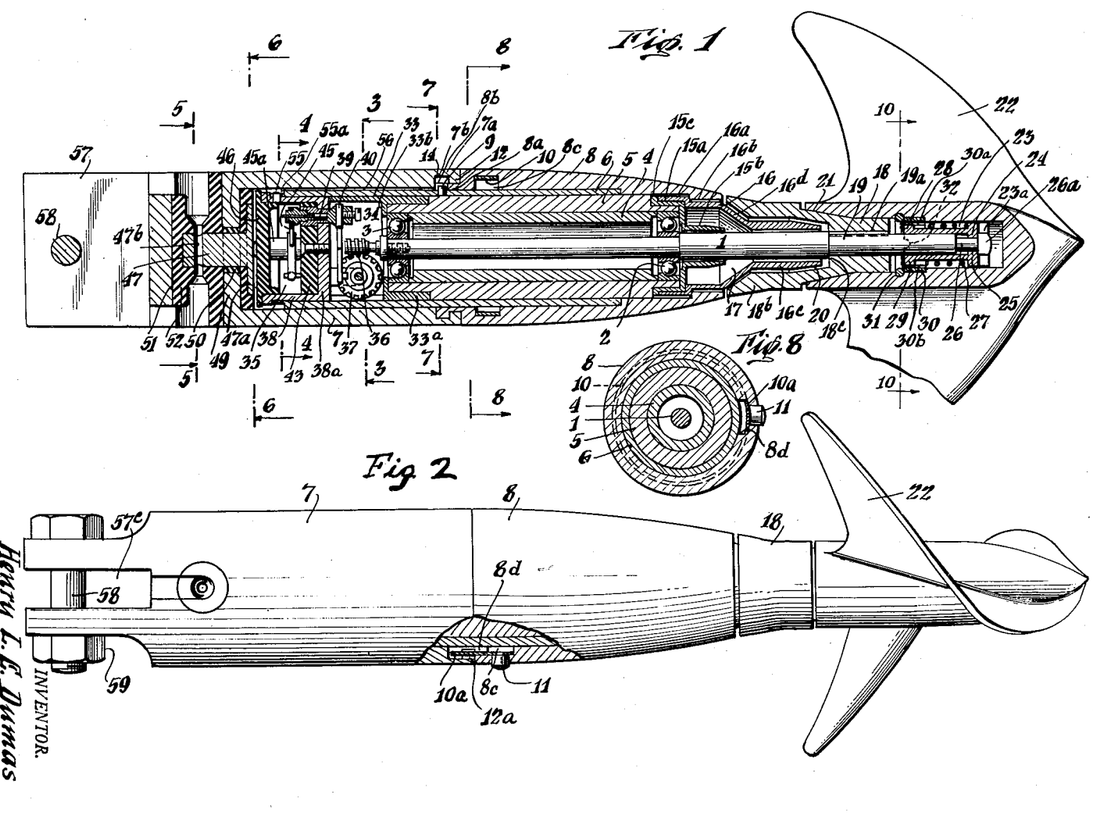
Fig. 1 is a longitudinal section of the assembled device.
Fig. 2 is a plan view of the device with parts broken away.
Fig. 8 is a transverse section on the line 8—8 of Fig. 1.
Figure 3:
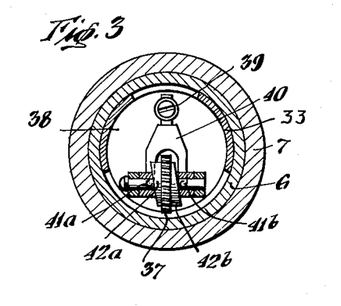
Fig. 3 is a transverse section on the line 3—3 of Fig. 1.
Figure 4:
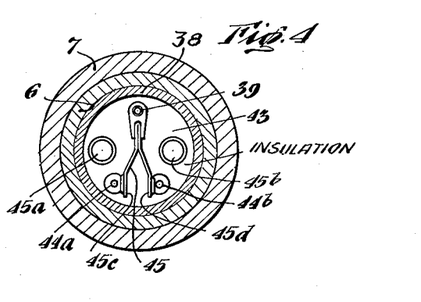
Fig. 4 is a transverse section on the line 4—4 of Fig. 1.
Figure 7:
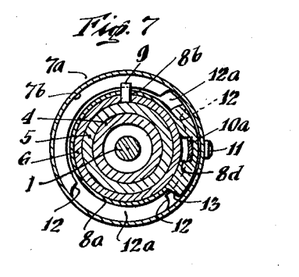
Fig. 7 is a transverse section on the line 7—7 of Fig. 1.

In Fig. 1 is shown a shaft 1 supported by two ball bearings 2 and 3 separated by a cylindrical spacing sleeve 4. These ball bearings 2 and 3 and the sleeve 4 are contained in a cylindrical housing 5 fitted in a cylindrical alignment tube 6 fitting closely within the cylindrical body 7 forming a part of the outer casing of the meter. A tapered hollow member 8 forms an extension of the outer casing and is connected to the body 7 through an interfitting and locking engagement established between the reduced end portion 7a of the body 7 and the cooperating inner peripheral extension 8a of the member 8. As shown more fully in Fig. 7, the reduced end portion 7a of the body 7 consists of a continuous annular outer rim portion provided with an annular undercut slot 7b set back from the end of the body 7. This leaves an overhanging flange 12 which is notched or slotted at spaced intervals as at 12a. The extension 8a of the member 8, at at least one and preferably at several points along its outer edge, is provided with lug extensions 13 adapted to fit within the annular space 14 defined by the slot 7b and which are spaced to correspond with the notches 12a. It will be understood that the parts are assembled by first aligning the lugs 13 with a selected series of the notches 12a, then sliding the members 7 and 8 toward one another until the lugs 13 are contained within the annular space 14, whereupon the member 8 is turned relatively to the body 7 until the lugs 13 are brought behind adjacent overhanging portions of the flange 12.

As shown more particularly in Figs. 1 and 2, the member 8 is connected for rotation with the alignment tube 6 by means of a pin 9 set in or otherwise secured to the tube 6 and fitting outwardly into a corresponding slot 8b in the annular extension 8a of the member 8. When the member 8 is rotated, this pin is engaged by the corresponding slot 8b and in this way the alignment tube 6 and the member 8 are rotated together.

The locking of the member 8 for rotation with the body 7 is brought about by means of a leaf spring 10 disposed within an annular slot 8c and provided with a lateral extension 10a lying partly within a slot 8d (Figs. 2 and 8) formed in the member 8 and partly within one of the notches 12a, and terminating within the annular space 14. As shown, the spring 10 is normally urged outwardly to the limits of the anular slot 8c and in this position will lie within one of the notches 12a and thus prevent relative rotative movement of the members 7 and 8.

When it is desired to adjust the relative positions of the members 7 and 8 rotatively for the purpose that will be more fully hereinafter described, the spring is depressed from the outside by means of the push-button 11, whereupon it clears the notch 12a thus permitting the members to be rotated relative to one another to a new predetermined position which may be indicated by suitable registering markings on the outside of the members 7 and 8.

The housing 5 for the bearing assembly is of reduced outer diameter at its forward end to provide an annular recess within which is fitted a longitudinally extending annular portion 15a of a cap 15 which is also provided with an annular portion 15b which uniformly surrounds the shaft 1 with a slight clearance. The cap 15 is also provided with an out-turned flange 15c which extends laterally outward from one end of the annulus 15a. A second roughly cone-shaped sleeve 16 surrounds the shaft 1 and is supported by the cap 15 through a press fitting engagement between the outwardly offset cylindrical flange 16a at the rear of the sleeve 16 and the annulus 15a of the cap 15. The sleeve 16 is provided with an intermediate cylindrical portion 16b joined to a third cylindrical portion 16c by the conical portion 16d. The cylindrical portion 16c uniformly surrounds the shaft 1 with a small clearance. As shown, the shape and proportions of the cap 15 and the sleeve 16 are such as to define between these members an enlarged space 17 that opens near its forward end directly to the shaft 1.

The enlarged spaced 17 functions as a decantation chamber; that is to say, any solid particles of sand, mud or other foreign bodies that shall have worked their way into the apparatus along the shaft 1 to this enlarged space will tend to settle out of the liquid suspension or be thrown off by centrifugal force, if the shaft is traveling at higher speeds, and deposit themselves in the decantation chamber 17. This arrangement also makes it possible to increase the clearance between the cylindrical portion of the cap 15 and the shaft 1 and likewise to increase the clearance between the cylindrical portion 16c of the sleeve 16 and the shaft 1. Consequently, the Reynolds number for the lubricant provided in this clearance space may be permitted to increase as compared with that which customarily obtains with the use of the capillary sealing sheathing employed in the prior current meter devices of this type. This results in markedly increasing the sensitivity of the device, since the resisting couple that would otherwise be set up by the sealing lubricant is practically suppressed. A generally conical member 18 fits about the reduced forward part 19 of the shaft 1 and is secured thereto by means of a spline connection 19a with a shoulder portion 18a of the member 18 in abutting relation to a corresponding shoulder on the shaft 1. The member 18 extends rearwardly at 18b to form a continuation of the outer casing of the device but is spaced a sufficient distance from the end of the member 8 to permit of free rotation of the member 18 at all times. It will also be observed that the contour of the inner wall of the portion 18b is such as to provide an annular space 20 of increasing cross-section between 18b and the adjacent portions 16d and 16c of the sleeve 16. This serves to prevent any solid particles which, by reason of their size, have been able to enter into the annular space 20 from wedging themselves into that space and in that way setting up friction and consequently reducing the sensitivity of the device.

As shown in the drawing, the member 18 is provided at its forward end with an outer partly conical and partly annular seating portion 21 upon which the helical screw 22 is centered and seated. The latter may be secured to the end of the shaft 1 in various known ways. However, the arrangement shown in Fig. 1 has the advantage that it insures against any danger that the helical screw 22 will become loosened and lost. According to this disposition the helical screw is held fast to the end of the shaft by means of a bayonet socket connection which includes a cylindrical holder 23 centered on the reduced end 19 of the shaft 1 and which is closed at the end 24 except for a rectangular opening 25 having a dimension adapted to receive the stud 26 and the flat part of the enlarged head portion 26a thereof. This stud 26 and the enlarged flat head portion 26a thereof are an integral extension of the reduced portion 19 of the shaft 1 and it will be understood that the portion 26a is of the same outer diameter as the portion 19 of the shaft 1.

It must be still understood that the cylindrical holder 23 is provided at its front part with a transverse slot 23a at right angles to the rectangular opening 25 and having a dimension adapted to receive the flat part of the portion 26a.

In removing the helical screw 22, the spring 27 is first compressed by moving the screw forwardly away from its seating position on the member 18 sufficiently to disengage the spur portions 28 of the holder 23 from their seating engagement in slots 30a, 30b in the ring 30. The ring 30 is held in place by the keeper 31 which rests in an angular groove on the inside of the hub of the screw 22. When the spurs 28 have been disengaged, it is then possible, by turning the screw 22 by a quarter turn, to bring the spurs 28 into resting notches 32 in the ring 30, thus restraining the holder 23 against turning movement relative to the helical screw. The spring 27 being thus held in compressed position and the helical screw being thus fastened together with the holder 23 and still remaining forwardly away from its seating position on the member 18, it is possible to slide the helical screw together with the holder 23 rearwardly along the portion 19 so as to allow the flat portion 26a of the shaft 1 to escape from the transverse slot 23a of the holder 23. Thereupon by turning the screw and the sleeve assembly a further quarter turn the head portion 26a is brought into line with the opening 25 thus allowing the helical screw and the holding assembly to be withdrawn.

It will be seen from the above that the helical screw may not accidentally free itself from the shaft. It will also be understood that the mounting of the screw on the shaft in the manner described makes it unnecessary to use tightening screws or other holding means that will impose deforming stresses on the blades. In fact any use of tools that might tend to alter the aspect of the surfaces of the blades is avoided.

At its rear end, the bearing housing 5 engages an annular forward extension 33a of the removable spacing member 33 and abuts against the inturned flange 33b thereof. The member 33 fits snugly within the alignment tube 6 and defines an open space 34 between the contact chamber 35 and the bearing chamber within which the reduction gearing is located. The reduction gearing comprises a worm 36 centered in the rear end of the main drive shaft 1 and a cooperating worm wheel 37.

The contact chamber 35 is defined by the cup-shaped removable member 38 which abuts the spacing member 33 and likewise fits within the alignment tube 6. The member 38 also includes a sealing wall 38a which serves at the same time to support the worm wheel 37 and is traversed by the shaft 39. On the reduction gearing chamber side of the wall 38a the shaft 39 is connected to a fork 40 provided with two fingers 41a and 41b. The spreading of these fingers is slightly greater than the distance between the inclined cam surfaces 42a and 42b carried on the opposite sides of the worm wheel 37. It will be seen that when the drive shaft 1 turns it drives the worm wheel 37 through the worm 36. Since the cam surfaces 42a and 42b rotate with the gear 37 they transmit an oscillating movement to the fork 40 which is in turn transmitted to the shaft 39. Since the fork 40 is constantly in operative connection with the gear 37, no spring is required to restore it. Furthermore, in the intervals of the rotation of the gear 37 after the fork 40 has been brought to the one extreme working position hereinafter described by the higher portion of the cam 42a or 42b on that side and until the opposite cam surface contacts the opposite finger 41a or 41b, the fork bears such light rubbing contact with the cams as to exert no braking action on the worm wheel 37. However, since the relationship of the fork and its fingers to the worm wheel 37 is closely determined by the operative connection above described, there is no danger that untimely contacts will be established through movements of the fork caused by vibrations imparted to the apparatus. This avoids the drawback that has been inherent in current meters wherein a contact lever system is restored by springs or spring blades.

Within the contact chamber, an insulating plate 43 is secured to the sealing wall 38. Two removable contact pins 44a and 44b are set in the plate 43, and are electrically connected to the spring pins 45a and 45b, which respectively traverse the open space within the contact chamber 35 and extend through the removable insulating cover 46 into contact with the enlarged face 47a of the stud 47.

The oscillating movements imparted to the shaft 39 by the cams 42a and 42b are transmitted by the shaft 39 to a fork 45 disposed within the contact chamber. The fork is secured at one end to the shaft 39. It is provided at the other end with fingers 45c and 45d so spaced as to be brought into contact respectively with the corresponding contact pins 44a and 44b, thus closing the electrical circuit, first from the pin 44a to the spring pin 45a, and then from the pin 44b to the spring pin 45b, which are in contact with the enlarged face 47a of the conductive stud 47.

The spring pins 45a and 45b are electrically insulated from the enclosing casing by an insulating washer 46. The conductive stud 47 extends rearwardly past the inturned end wall of the outer casing 7 and is insulated therefrom by a non-conductive sleeve 48. The stud 47 terminates in a cavity in the side of a non-conductive tubular body 52 which fits within the opening 57b extending through the supporting member 57 at right angles to the longitudinal axis thereof.

Figure 5:
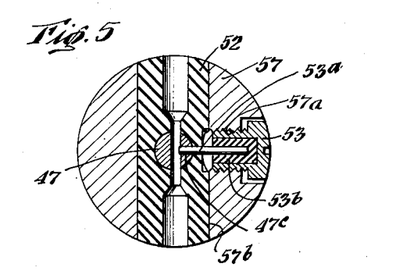
Fig. 5 is a transverse section on the line 5—5 of Fig. 1.

Connection between the conductive stud 47 and the usual indicating or registering apparatus, not shown, is effected by introducing the bare end of a conducting wire into the transverse opening 47b, through the stud 47, to which it may be secured in any suitable manner. For example, as shown in Fig. 5, a laterally extending screw threaded member 53 may be screwed into the threaded opening 57a in the side wall of the support 57 and bear against a pin 53a insulated from the member 53 by the interposed non-conductive member 53b. As shown, the pin 53a extends through the opening 47c formed in the conductive stud 47 at right angles to the opening 47b. The inner end of pin 53a engages and holds the tip of the lead-in wire (not shown) after the latter is inserted in the opening 47b.

It will be seen that the conductive stud 47, by reason of its embedded position within the non-conductive body 52 and the positioning of the connection with the lead-in wire beyond the confines of the enclosing housing, not only offers a very limited surface for possible contact with the liquid in which the device is submerged in use, but also is spaced much farther from the enclosing housing than is the case of the corresponding electrically conductive member of the prior devices of this art. This results in considerable reduction in the leakage of current. Moreover, the device leads itself readily to use in electrically conductive liquids, such as sea water, since it is a simple matter to fill up with a suitable insulating material the opening 47b through which the lead-in wire is introduced, thus insuring against leakage of current from this point.

Figure 6:
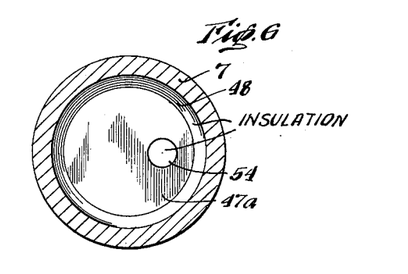
Fig. 6 is a transverse section on the line 6—6 of Fig. 1.

As shown in Fig. 6, the enlarged face 47a of the stud 47 is provided with a small spot 54 of insulating material, e. g. wax. This spot is spaced the same distance from the center of the stud as the spring pins 45a and 45b, so that if one of these pins is brought into contact with it, transmission of a signal through that pin 45a or 45b will not take place. It will be understood that when the positions of the pins 45a and 45b are so adjusted relative to the enlarged face 47a that neither of them is opposite the spot 54, the successive contact of the fork fingers 45c and 45d with their respective contact pins 44a and 44b under the compulsion of the cams 42a and 42b, will produce two electrical impulses with each turn of the gear 37. On the other hand, if the contact chamber assembly and the associated reduction gearing chamber is rotated relative to the conductive stud 47, so that one or the other of the pins 45a and 45b is brought into contact with and rests upon the spot 54, then only one impulse will be produced for each turn of the gear 37.

The above arrangement thus provides a simple mechanical control for an electrical interrupter by which it is possible to change the number of contacts per turn of the final gear of the reduction gear train by a simple manual manipulation and without the necessity of taking the device apart or transferring the outside wire from one terminal to another. Moreover, the manipulation may be performed while the device is in a relatively inaccessible position.

Figure 9:
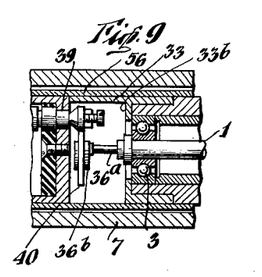
Fig. 9 is a longitudinal section of the assembled device showing how to obtain directly a contact or two contacts by a mere rotation of the shaft.
Figure 10:
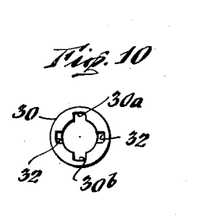
Fig. 10 is a detail view of one part of the device, taken along the line 10—10 of Fig. 1, looking in the direction of the arrows.
Figure 11:
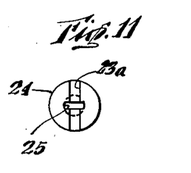
Fig. 11 is a right end view of the holder 23 of Fig. 1.
Figure 12:
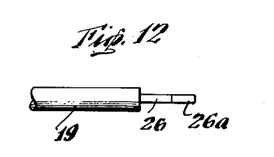
Fig. 12 is a plan view of the right end of the drive shaft.

As shown in Fig. 9 an alternative modification of the means for obtaining the electrical contacts must be understood as follows: the pinion gear 37 being taken apart, a stud 36a is centered in the rear of shaft 1 in place of the worm gear 36 in such a way as to allow the cam 36b to protrude in a rectangular opening in fork 40, the spreading of this opening being slightly greater than the outer diameter of the cam 36b. Thus it will be seen that for each revolution of the drive shaft 1 an oscillating movement is imparted to the fork 40 through stud 36a and cam 36b and is transmitted to the contact chamber through shaft 39. The above arrangement thus provides a way for obtaining, if necessary, either one or two electrical contacts by a single turn of the main shaft 1 as it is sometimes useful when the device has to be used for measuring slow flow velocities.

It will be seen from the above that the principal parts or units constituting the device; that is to say, the enclosing casing or body portion 7, the tapered member 8 which cooperates therewith, the alignment tube 6, the bearing housing 5 and the spacing sleeve 4, the spacing member 33 defining the reduction gearing chamber, the cup-shaped member 38 defining the contact chamber 35 and the helical screw seating sleeve 18, are all rotatable pieces, and may be fitted together without the help of any threaded or fixing screw nut, and may be assembled or disassembled without the use of either ordinary or special tools.

It is also seen that the removable contact chamber 35 may be withdrawn easily from the body of the alignment tube 6, and immediately replaced, in case of deterioration of that unit, by another identical one, without causing any prolonged suspension of the use of the apparatus. Likewise, if desired, this unit may be substituted by a high or low frequency generator or a continuous current device or other known devices for indicating current velocities or speed of travel, depending upon the intended use of the apparatus.

It will also be seen that the arrangements and method of assembly avoid the presence of any opening, more or less sealed, communicating with the outside at any point rearwardly of the hole for the passage of the shaft 39, without the intervention of any joint, insuring against longitudinal circulation of liquid from the front to the rear through the mechanism and at the same time preventing the introduction of foreign material therein.

Moreover, the location of the contact chamber 35 in the interior and at the bottom of the sealed body of the meter is brought about without the intervention of any joint accessible to the outside liquid and to foreign material, thus providing increased certainty of the proper functioning of the contacts.

The assembly of the various parts of the device may be conveniently carried out in the following manner:

The non-conductive tubular body 52 is first inserted in the opening 57b and turned so that the stud-receiving cavity extending partially through from one side is facing forwardly and centered to receive the end of the conductive stud 47, which is previously set through the non-conductive sleeve 48 and annulus 50 and then passed from within the body 7 through the central opening in the end wall thereof and press fitted into the cavity.

The various contact elements and the mechanical operating mechanism therefor, including the shaft 39, having previously been assembled within the cup-shaped member 38 defining the contact chamber 35, the latter is filled with a thick oil or other suitable non-conductive liquid, and then closed by the cover 46. The contact chamber assembly is then fitted into the rearward end of the alignment tube 6 in a predetermined relation thereto with the aid of the pin 55 which fits into a corresponding slot 55a in the side wall of the tube 6 at the end thereof. As shown, the pin 55 is carried by the member 38. A small quantity of oil having previously been placed upon the enlarged face 47a of the stud 47, the tube 6 and the associated contact chamber assembly are then introduced from the upper end of the body 7 and moved to the bottom of the open space therein. As the assembly is brought to its final position, the oil previously deposited at the bottom of the space will fill up the very small space between the cover 46 and the face 47a of the stud 47. As the assembly is moved into place, the air present in the space to be occupied by the contact chamber assembly will escape through a small groove 56 extending lengthwise along the external surface of the tube 6 to a point about halfway along the length of this tube, where it connects with the annular lug-receiving space 14 adjacent the forward end of the member 7. This disposition also insures equilibrium of the pressures on the front and rear surfaces of the contact chamber.

The spacing member 33 defining the reducing gearing chamber may be inserted within the tube 6, either prior to its introduction with the contact chamber assembly into the body 7 or later on. In either case, the mechanical elements of the reducing gearing, except the worm gear, will be introduced at the same time.

The tube 6 is then partially filled with a lubricant. The worm 36 having been previously fixed in the end of the drive shaft 1, and the latter having been assembled with the bearing assembly within the bearing housing 5, with the cap 15 and the sleeve 16 also fitted in place, this whole assembly is fitted within the alignment tube 6. When the assembly nears the bottom of the space, and the worm 36 comes into contact with the worm wheel 37, engagement of the gears will, of course, be facilitated by slowly turning the shaft 1 as the assembly is brought to its final seating position. The lubricant previously introduced into the space occupied by the bearing and the drive shaft assembly, will rise up as the assembly is brought to seating position, and will fill all of the empty spaces, including the decantation chamber 17, thereby driving the air present therein out in front of it. Thereafter, the tapered portion 8 of the outside casing is fitted into place and fixed there by turning the casing 8 relative to the body 7 sufficiently to bring the lug extensions 13 behind overhanging portions of the flange 12.

The lubricant introduced into the tube 6 may be pure water or another liquid of similar viscosity. Water may be used because longitudinal circulation of the lubricant to the contact chamber and to the narrow space between the rear wall of the contact chamber and the conductive stud 47, is prevented by the arrangements previously described. The use of a low viscosity liquid, such as water, serves further to diminish the passive resistance to the turning of the parts. Moreover, the use of water as the lubricant avoids the known undesired effects arising when an oil comes into contact with water, or another outside liquid having a different surface tension and density, and which have adversely affected the efficiency of the capillary sheathings that have heretofore been employed, by gradually permitting the outside liquid to penetrate into the interior of the mechanism through the replacement of part of the oil originally contained in the sheathing.

The worm 36 fixed to the rear end of the drive shaft 1 should be given as small a radius as compatible with adequate mechanical resistance and facility of manipulation. In this way, the resisting couple due to the friction of the worm acting against the teeth of the worm wheel 37 may be brought to a very low value, thus further lessening the over-all positive resistance of the device.

The apparatus may be fixed to any appropriate support in ways commonly employed in the art. As shown, by way of example in Figs. 1 and 2, the rear part of the apparatus may be provided with a slot 57c and a bolt hole 58 extending at right angles through the slot for passage of a bolt 59, thus permitting the apparatus to be used on all normal supports in current use as well as with any of the known arrangements of suspension by cable or with floats.

The thrust on the helical screw 22 is received by the ball bearings 2 and 3 through the intermediary of the shaft 1. The symmetrical assembly of these bearings, so that they perform at will the function of receiving endwise thrusts from either direction and of guiding the shaft, makes it possible to utilize the apparatus as a floating electrical log for measuring velocities of travel through a liquid near the free surface thereof. When the device is so used, the liquid current acts upon the helical screw 22 in a direction contrary to the normal direction, and consequently exerts a traction force on the shaft instead of a thrust. This arrangement widens the field of use of the apparatus to include a field that has heretofore been reserved to special apparatus, and which has not been satisfactorily served by the previously known types of current meters.

I claim:

1. In a liquid flow meter of the helical screw type, an enclosing casing for the operating mechanism comprising two cylindrical sections having opposed annular end wall portions adapted to be brought into interfitting sealing engagement with one another through manual manipulation of said sections, means carried by one of said sections and accessible to the exterior of said casing for locking said sections together, a tubular alignment sleeve fitting within said casing in overlapping sealing relation to the sealing joint between said sections, and a cup-shaped member having cylindrical side walls closely fitting within said alignment sleeve and establishing a sealed partition between the forward part of the interior of said casing and the rearward part thereof, a drive shaft in said forward part of the casing and extending outwardly thereof, a helical screw on the outer end of said shaft, a longitudinally-extending shaft mounted in said partition, means disposed in the space forward from said partition establishing a driving connection between the drive shaft and the shaft mounted in the partition; a circuit interrupter in the space rearward from said partition, and means establishing an operative connection between said circuit interrupter and said longitudinally-extending shaft.

2. In a liquid flow meter of the helical screw type, an enclosing casing for the operating mechanism comprising two cylindrical sections having opposed annular end wall portions adapted to be brought into interfitting sealing engagement with one another through manual manipulation of said sections; means carried by one of said sections and accessible to the exterior of said casing for locking said sections together, a tubular alignment sleeve fitting within said casing in overlapping sealing relation to the sealing joint between said sections, a cylindrical bearing housing fitting closely within said alignment sleeve and enclosing spaced bearings for the screw-driven main shaft of said meter, means including an annular cap disposed at the forward end of said bearing housing for closing said housing against access of liquid except to the extent necessitated to permit of free turning of said main shaft within said cap.

3. In a fluid flow meter comprising a helical screw, a shaft supporting said screw and driven thereby, a housing, bearing means in said housing supporting said shaft, an electric switch mechanism in said housing operatively connected to the shaft to be operated upon rotation of the shaft by the screw, and electric terminal means insulated from the housing and electrically connected to the switch mechanism; the improvement which comprises a switch assembly adapted for insertion within said housing and removal therefrom as a unit, said assembly comprising means defining a sealed chamber, switch mechanism in said chamber, and a switch operating member connected to said switch mechanism and projecting outside said chamber; electrical connector means comprising cooperating conductive elements on the housing and the chamber which engage to form an electrical connection between the terminal means and the switch mechanism when the switch assembly is inserted in the housing; and means operatively connecting the shaft and the switch operating member when both are in place in the housing.

4. In a fluid flow meter comprising a helical screw, a shaft supporting said screw and driven thereby, a housing, bearing means in said housing supporting said shaft, an electric switch mechanism in said housing operatively connected to the shaft to be operated upon rotation of the shaft by the screw, and electric terminal means insulated from the housing and electrically connected to the switch mechanism; the improvement which comprises a conductive portion of said terminal means having a surface exposed to the interior of the housing, a switch assembly adapted for insertion within said housing and removal therefrom as a unit, said assembly comprising means defining a sealed chamber, switch mechanism in said chamber, an electrically conductive pin forming a part of said switch mechanism and projecting from said chamber so as to engage said surface and electrically connect the switch mechanism to the terminal means when the chamber is in the housing, and a first operating member connected to the switch mechanism and projecting outside said chamber; and a switch mechanism driving assembly adapted for insertion within the housing and removal therefrom as a unit, said driving assembly comprising said shaft, spaced bearing means supporting the shaft, a sleeve supporting the spaced bearing means, and a second operating member operatively connected to the shaft and effective to transmit motion to the first operating member when both are in place within the housing.

5. In a fluid flow meter comprising a helical screw, a shaft supporting said screw and driven thereby, a housing, bearing means in said housing supporting said shaft, an electric switch mechanism in said housing operatively connected to the shaft to be operated upon rotation of the shaft by the screw, and electric terminal means insulated from the housing and electrically connected to the switch mechanism; the improvement which comprises a cylinder formed in said housing and closed at one end, a conductive portion of said terminal means having a surface exposed to the interior of the cylinder at said closed end, a switch assembly adapted for insertion within said cylinder and removal therefrom as a unit, said assembly comprising means defining a sealed cylindrical chamber adapted to fit closely in said cylinder, switch mechanism in said chamber, an electrically conductive pin forming a part of said switch mechanism and projecting from the end of said chamber nearest the closed end of the cylinder so as to engage said surface and electrically connect the switch mechanism to the terminal means when the chamber is in place in the cylinder, and a first operating member connected to the switch mechanism and projecting from the opposite end of said chamber; and a switch mechanism driving assembly adapted for insertion within the housing and removal therefrom as a unit, said driving assembly comprising said shaft, spaced bearing means supporting the shaft, a cylindrical sleeve encircling and supporting the spaced bearing means and adapted to fit closely in said cylinder, and a second operating member operatively connected to the shaft and effective to transmit motion to the first operating member when both are in place within the housing.

6. In a fluid flow meter comprising a helical screw, a shaft supporting said screw and driven thereby, a housing, bearing means in said housing supporting said shaft, an electric switch mechanism in said housing operatively connected to the shaft to be operated upon rotation of the shaft by the screw, and electric terminal means insulated from the housing and electrically connected to the switch mechanism; the improvement which comprises a conductive portion of said terminal means having a surface exposed to the interior of the housing, a switch assembly adapted for insertion within said housing and removal therefrom as a unit, said switch assembly comprising means defining a sealed chamber, switch mechanism in said chamber, an electrically conductive pin forming a part of said switch mechanism and projecting outside said chamber so as to engage said surface and electrically connect the switch mechanism to the terminal means when the chamber is in the housing and a first operating member connected to the switch mechanism and projecting outside said chamber; a gearing assembly adapted for insertion within the housing and removal therefrom as a unit, said gearing assembly including a second operating member and a worm wheel connected thereto, said second operating member cooperatively engaging said first operating member when said gearing assembly is inserted within the housing;

and a bearing and shaft assembly adapted for insertion within the housing and removal therefrom as a unit, said bearing and shaft assembly including said shaft, spaced bearing means supporting the shaft, a sleeve supporting the spaced bearing means, and a worm on said shaft cooperatively engaging the worm wheel in said gearing assembly when the bearing and shaft assembly is inserted within the housing.

7. In a fluid flow meter comprising a helical screw, a main shaft supporting said screw and driven thereby, a housing, bearing means in said housing supporting said shaft, an electric switch mechanism in said housing operatively connected to the shaft to be operated upon rotation of the shaft by the screw, and electric terminal means insulated from the housing and electrically connected to the switch mechanism; the improvement which comprises a conductive portion of said terminal means having a surface exposed to the interior of the housing, a switch assembly adapted for insertion within said housing and removal therefrom as a unit, said switch assembly comprising means defining a sealed chamber, switch mechanism in said chamber, an electrically conductive pin forming a part of said switch mechanism and projecting outside said chamber so as to engage said surface and electrically connect the switch mechanism to the terminal means when the chamber is in the housing, a switch operating shaft connected to the switch mechanism and projecting outside said chamber, and a yoke fixed on said switch operating shaft outside said chamber and having spaced parallel arms; and a switch mechanism driving assembly adapted for insertion within the housing and removal therefrom as a unit, said driving assembly comprising said main shaft, spaced bearing means supporting the main shaft, a sleeve supporting the spaced bearing means, and a cam on said shaft movable into a position between and in driving engagement with the arms of said yoke so that it drivingly engages the yoke when the driving assembly is inserted within the housing.

8. In a fluid flow meter comprising a helical screw, a shaft supporting said screw and driven thereby, a housing, bearing means in said housing supporting said shaft, an electric switch mechanism in said housing operatively connected to the shaft to be operated upon rotation of the shaft by the screw, and electric terminal means insulated from the housing and electrically connected to the switch mechanism; the improvement which comprises a cylinder formed in said housing and closed at one end, a conductive portion of said terminal means having a flat surface exposed to the interior of the cylinder at said closed end, a switch assembly adapted for insertion within said housing and removal therefrom as a unit, said assembly comprising means defining a sealed cylindrical chamber adapted to fit closely in said cylinder, a pair of switch contacts in said chamber, said chamber having an insulating cover facing said closed cylinder end, and an electrically conductive pin forming one of said contacts and projecting through said cover so as to engage said surface and electrically connect said one contact to the terminal means when the chamber is in the housing.

9. In a fluid flow meter comprising a helical screw, a shaft supporting said screw and driven thereby, a housing, bearing means in the housing supporting the shaft, an electric switch mechanism in the housing operatively connected to the shaft to be operated upon rotation of the shaft by the screw, and electric terminal means insulated from the housing and electrically connected to the switch mechanism; the improvement which comprises two relatively rotatable sections of said housing, means for locking said housing sections in either of two relative angular positions, two pairs of contacts in said switch mechanism, and electric connector means between said contacts and said terminal means, said connector means including two connector elements respectively movable with said housing sections and effective when said sections are in one only of said angular positions to interrupt the electrical connection between one of said pairs of contacts and said terminal means.

10. In a fluid flow meter comprising a helical screw, a shaft supporting said screw and driven thereby, a housing, bearing means in said housing supporting said shaft, an electric switch mechanism in said housing operatively connected to the shaft to be operated upon rotation of the shaft by the screw, and electric terminal means insulated from the housing and electrically connected to the switch mechanism; the improvement which comprises a cylinder formed in said housing and closed at one end, a conductive portion of said terminal means having a flat surface exposed to the interior of the cylinder at said closed end, a switch assembly adapted for insertion within said housing and removal therefrom as a unit, said assembly comprising means defining a sealed cylindrical chamber adapted to fit closely in said cylinder, two pairs of switch contacts in said chamber, said chamber having an insulating cover facing said closed cylinder end, and two electrically conductive pins respectively forming one of each of said pairs of contacts and projecting through said cover so as to engage said surface and electrically connect said one contact to the terminal means when the chamber is in the housing; two relatively rotatable sections of said housing, means for locking the housing sections in either of two relative angular positions, a mechanical connection between one housing section and said conductive portion of the terminal means, a mechanical connection between the other housing section and said chamber defining means, and an insulating member having a surface contiguous to said flat surface of the conductive portion of the terminal means, said surface of the insulating member engaging one of said pins when the housing sections are in one only of said two positions to interrupt the electrical connection between one of said pairs of contacts and said terminal means.

11. In a fluid flow meter comprising a helical screw, a shaft supporting said screw and driven thereby, a housing, bearing means in said housing supporting said shaft, an electric switch mechanism in said housing operatively connected to said shaft to be operated upon rotation of the shaft by the screw, and electric terminal means insulated from the housing and electrically connected to the switch mechanism; the improvement which comprises two relatively rotatable sections of said housing, means for releasably locking said housing sections together to form a cylinder closed at one end and open at the other, the housing section at said closed cylinder end supporting said terminal means and enclosing said switch mechanism, and the housing section at the open cylinder end encircling a portion of said shaft and supporting a portion of said bearing means.

12. A fluid flow meter as claimed in claim 11, including a sealing sleeve fitting closely within said cylinder and spanning the line of joinder of the two sections.

13. In a fluid flow meter comprising a helical screw, a shaft supporting said screw and driven thereby, a housing, bearing means in said housing supporting said shaft, an electric switch mechanism in said housing operatively connected to said shaft to be operated upon rotation of the shaft by the screw, and electric terminal means insulated from the housing and electrically connected to the switch mechanism; the improvement which comprises two relatively rotatable sections of said housing, means for releasably locking said housing sections together to form a cylinder closed at one end and open at the other, the housing section at said closed cylinder end supporting said terminal means and enclosing said switch mechanism, and the housing section at the open cylinder end encircling a portion of said shaft and supporting a portion of said bearing means; a sleeve mounted on the shaft outside the housing and closely spaced from said housing so as to substantially close said open end, and means within the housing adjacent said open end defining a decantation chamber for receiving solids which pass between the sleeve and the housing.

14. In a fluid flow meter comprising a helical screw, a shaft supporting said screw and driven thereby, a housing, bearing means in said housing supporting said shaft, an electric switch mechanism in said housing operatively connected to said shaft to be operated upon rotation of the shaft by the screw, and electric terminal means insulated from the housing and electrically connected to the switch mechanism; the improvement which comprises two relatively rotatable sections of said housing, means for releasably locking said housing sections together to form a cylinder closed at one end and open at the other, the housing section at said closed cylinder end supporting said terminal means and enclosing said switch mechanism, and the housing section at the open cylinder end encircling a portion of said shaft and supporting a portion of said bearing means, a first sleeve mounted on the shaft outside the housing and closely spaced from the housing so as to substantially close said open end, a fixed sleeve mounted on the housing and surrounding the shaft in spaced relation to said first sleeve, said fixed sleeve being slightly spaced from the shaft at the end nearest said first sleeve, and a shield supported within the housing inside said fixed sleeve and closely spaced from the shaft to restrict the passage of liquid therealong, said shield and said fixed sleeve cooperating to define a decantation chamber to receive solids which pass between the fixed sleeve and the housing.

15. In a fluid flow meter comprising a housing, a shaft extending outwardly of the housing, and a helical screw drivingly attached to the shaft; the improvement which comprises a cup-shaped holder having one end contoured to conform with a non-circular portion of said shaft so that said holder is locked against rotation with respect to said shaft when said end engages said portion, said holder being movable endwise on the shaft between locked and released positions, and cooperating non-circular portions on said screw and said holder effective to lock the screw against rotation with respect to the holder, said screw being movable endwise on the holder between locked and released positions, and a spring retained between the screw and the holder and effective to bias the screw to the position where it is locked on the holder and to bias the holder to the position where it is locked on the shaft.

16. In a fluid flow meter comprising a housing, a shaft extending outwardly of the housing, and a helical screw attached to said shaft to drive the same; the improvement which comprises a stud having a flattened head formed on the end of said shaft, a cup-shaped holder open at one end and closed at the other, said open end being receivable on said shaft, said closed end having a slot therein to receive said head and a transverse groove in its outer surface extending at an angle with respect to said slot and contoured to engage said flattened head in torque-transmitting relation, said holder having a pair of diametrically opposite outwardly projecting spurs at its open end, said screw having a bore therein to receive the shaft end and an internal flange in said bore, said flange having diametrically opposite notches extending partially through its inner periphery for at times receiving said spurs and also having diametrically opposite slots extending completely through its inner periphery and angularly spaced from said notches for at other times receiving said spurs, and a spring held in compression between said closed end of the holder and said flange and normally effective to hold the groove in said holder in torque-transmitting relation with said head and to hold said slots in torque-transmitting relation with said spurs so as to cause said shaft to turn concurrently with said screw, said screw being movable outwardly along the shaft so as to move said slots out of torque-transmitting relation with said spurs whereby a rotation of the screw will align the notches with spurs and a subsequent inward movement of the screw will bring the notches into torque- and thrust-transmitting relation with the spurs, whereby a further inward movement of the screw will drive the holder inward and release the stud head from the groove in the holder end, so that a further rotation of the screw and holder will bring the slot in the holder end into alignment with the slot, whereupon screw, holder and spring may be removed endwise from the shaft.

HENRY LOUIS ETIENNE DUMAS.

REFERENCES CITED

The following references are of record in the file of this patent:

UNITED STATES PATENTS

| Number | Name | Date |
| --- | --- | --- |
| 1,368,000 | Titterington | Feb. 8, 1921 |
| 2,287,612 | Hardin | June 23, 1942 |
| 2,355,921 | Mercier et al. | Aug. 15, 1944 |

FOREIGN PATENTS

| Number | Country | Date |
| --- | --- | --- |
| 476,936 | Germany | May 28, 1929 |
| 521,412 | Great Britain | May 21, 1940 |